Oct. 3, 1967   J. K. PETERS   3,344,550
FISH LURES
Filed June 17, 1965

INVENTOR.
John K. Peters
BY
ATTORNEY

United States Patent Office 3,344,550
Patented Oct. 3, 1967

3,344,550
FISH LURES
John K. Peters, Traverse City, Mich., assignor to Burke Flexo-Products Company, Traverse City, Mich.
Filed June 17, 1965, Ser. No. 464,615
2 Claims. (Cl. 43—42.14)

ABSTRACT OF THE DISCLOSURE

A torpedo shaped body of flexible thermoplastic resin, with an angled wire molded in one end, one arm of the angle extending forwardly to a line attaching eye at the exterior of the body, and the other arm extending downwardly to a hook supporting eye recessed into the bottom of the body; a link chain molded into the body with its forward link engaged around the bend in the angled wire; a straight wire molded in the rear end of the body with an eye on its front end engaged with the rear link of the chain and with another eye on its rear end exposed behind the rear of the body; a spinner on each of the exposed ends of the forwardly extending wire and on the exposed rear end of the straight wire; and hooks attached to the eyes on the downwardly extending arm of the angled wire and on the rear end of the straight rear wire.

---

This invention relates to fish lures.

The main objects of the invention are:

First, to provide a fish lure including an elongated, laterally bendable body member of resilient thermoplastic material and having a line attaching member at its front end and a hook attaching member at its rear end, inner portions of said line and hook attaching members being supportedly embedded in said body member, and connecting means for said front and rear members connected to the embedded inner ends thereof consisting of a plurality of metallic, swingably engaged links capable of sustaining longitudinal loads or stresses without distortion of the connecting means under lateral bending of the body.

Second, to provide a fish lure which includes the said structural features in which the front coupling member terminates at its inner end in a downwardly projecting arm, the inner portion of which is embedded in said body member and which has a downwardly and forwardly angled arm with a hook attaching eye at its lower end, the body member being provided with an outwardly opening recess in which said hook attaching eye is disposed, said rear member being provided with a hook attaching eye at its outer end, the coupling members being connected within the body by a flexible link chain connected to the angled portion of the front coupling member and to an embedded eye on the rear coupling member.

Third, to provide a fishing lure which can be economically produced by molding a soft flexible body about an internal, load carrying harness that can be easily supported in a mold with connections for hooks and lines easily accessible on the exterior of the molded body.

Other objects and advantages of the invention will be apparent from a consideration of the following description and claims. The drawing, of which there is one sheet, illustrates a highly practical and preferred form of the invention.

Figure 1:
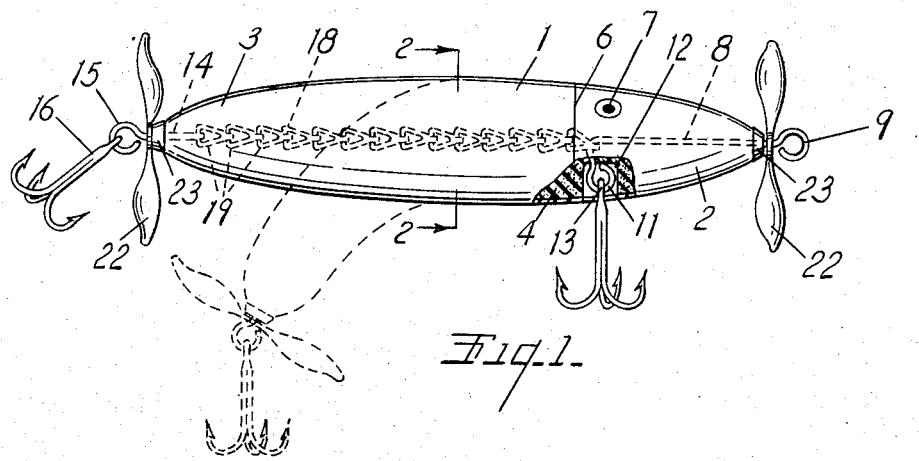
FIG. 1 is a side elevational view of the lure partially broken away in cross section.
Figure 2:
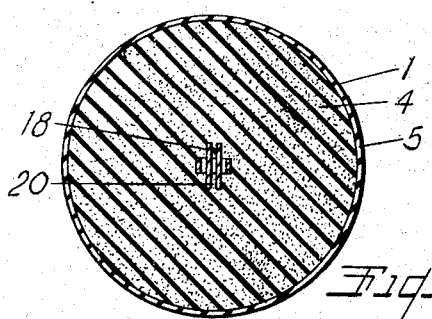
FIG. 2 is a transverse cross sectional view along the plane of the line 2—2 in FIG. 1.
Figure 3:
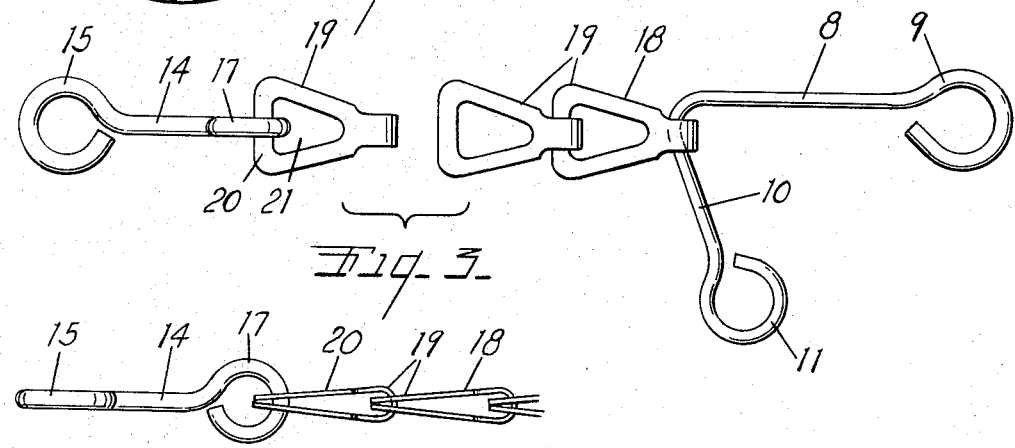
FIG. 3 is an enlarged fragmentary side elevational view of the internal load carrying harness.
Figure 4:
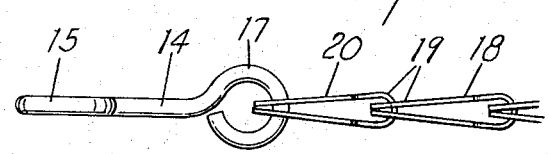
FIG. 4 is an enlarged fragmentary top plan view of the rear portion of the harness.

The embodiment of my invention illustrated comprises the elongated body member 1 having a forwardly tapered front end portion 2 and rearwardly tapered rear end portion 3. The body member illustrated is of round cross section and is desirably formed of rubber or thermoplastic material shown in section at 4 in FIGS. 1 and 2. An integral, smooth skin 5 is formed on the body incident to the molding of the body and this has a front end portion desirably in front of the circumferential line 6 of one color and the remainder of another color. The portion in front of the line 6 may be designated a head portion and is provided with conventionally illustrated eyes 7. However, it should be understood that the cross sectional shape and the size of the body may be greatly varied.

A line and hook attaching member 8 is formed of wire stock and is embedded in the body member with a portion projecting from the front end of the body member and having an eye 9 at its outer end for the attachment of a line. At its inner end the member 9 is provided with a downwardly and forwardly angled projecting portion 10 terminating in an eye 11. This member 8 is moldingly embedded in the body member which, however, in the embodiment illustrated is provided with a recess 12 in which the loop or eye 11 is disposed, the eye 13 on the shank of the hook being engaged in this loop or eye 11.

The rear hook attaching member 14 is embedded in the rear end of the body member with the eye 15 on its rear end projecting to receive the rear hook 16. The member 14 is provided with an eye 17 at its inner end.

A coupling 18 is provided for the line connecting member 8 and the member 14. This coupling 18 comprises a plurality of links 19 of sheet metal stock and comprises side portions 20 having openings 21 therein of such length that one of the arms of the link may be inserted through the opening, thus forming a chain-like connecting means for the front member 8 and the rear member 14. The arms of the rear link are engaged with the eye 17 of the rear member 14, while the loop portion of the front link is engaged with the downwardly projecting arm of the member 8. The inner ends of the front member 8 and the rear member 14 and the links of the coupling member are moldingly embedded in the body member. This coupling member is of substantial length so that the body member may be flexed laterally. I have indicated the flexibility of the body of the lure by dotted lines in FIG. 1.

In the embodiment illustrated, spinners 22 are arranged on these front and rear projecting portions 8 and 14, and thrust bearings 23 are provided for these spinners, these being cupped to embrace the inwardly tapered ends of the body member and they serve as supports for the projecting portions of the members 8 and 14. As stated, with the parts thus arranged, the body member may be of varying length and cross sectional shape and may be laterally flexible, but the body member is subjected to very little fracturing stress under use conditions.

The harness, consisting of the front member 8, 10, chain 18 and rear member 14, is particularly adapted to be supported and located centrally of a mold (not illustrated) by engaging the eyes 9, 11 and 15 on pins carried by one half of a separable mold exterior to the mold cavity. The other part of the mold has mating recesses to closely receive the portions of the harness which project from the mold recess for the body portion of the lure. After the harness is in place and the mold closed, the body may be formed by injection of suitable material, that is, heat or chemically settable substances to provide the desired form of body. Various moldable materials and molding and curing processes are well known and so are not described in detail.

I have illustrated one highly desirable embodiment of my invention. I have not illustrated other embodiments as it is believed that this disclosure will enable those skilled in the art to adapt my invention to shapes, sizes and designs as may be desired.

What I claim as new is:

1. A fish lure comprising an elongated body member of bendable springably resilient thermoplastic material and including an intermediate portion of substantial length and of cylindrical cross section and outwardly tapered front and rear portions, a relatively rigid angled line and hook attaching member formed of wire having a portion disposed longitudinally of and embedded in the front end portion of said body member with a portion thereof projecting forwardly from the body member and having a line attaching eye at its outer end, said line and hook attaching member having a downwardly projecting arm at its inner end terminating in a hook attaching eye, said body member having a downwardly opening recess in which said hook attaching eye is disposed, a hook swingably engaged with said hook attaching eye, a relatively rigid and straight rear hook attaching member formed of wire having a portion thereof embedded in the rear end of said body member and having a portion projecting from the rear end of said body member and provided with a hook attaching eye, said rear hook attaching member having an eye on its inner end, a coupling chain for said line and said hook attaching members comprising a plurality of links, said links being of looped sheet stock and having openings in the arms thereof with which the bights of adjacent links are pivotally engaged, the bight of the foremost link being engaged with said downwardly projecting arm on said line and hook attaching member, said rear hook attaching member having said eye on its inner end engaged within the opening of the rearmost link, a rear hook engaged with said eye on the outer end of said rear hook attaching member, said chain and the nonprojecting portions of said line and hook attaching member and said rear hook attaching member being molded within said body member.

2. A fish lure as defined in claim 1 in which there are spinners mounted on the projecting front end of said line and hook attaching member and the projecting rear end of said rear hook attaching member.

References Cited

UNITED STATES PATENTS

| | | | |
|---|---|---|---|
| 972,748 | 10/1910 | Breder et al. | 43—42.14 |
| 2,865,130 | 12/1958 | Accetta | 43—42.53 X |
| 3,218,750 | 11/1965 | Lewin | 43—42.36 X |

FOREIGN PATENTS

| | | |
|---|---|---|
| 393,514 | 6/1933 | Great Britain. |

SAMUEL KOREN, *Primary Examiner.*

D. J. LEACH, *Assistant Examiner.*